Dec. 23, 1958   J. D. McMICHAEL   2,865,467
CLEANER SILENCER ASSEMBLY
Filed Sept. 15, 1955
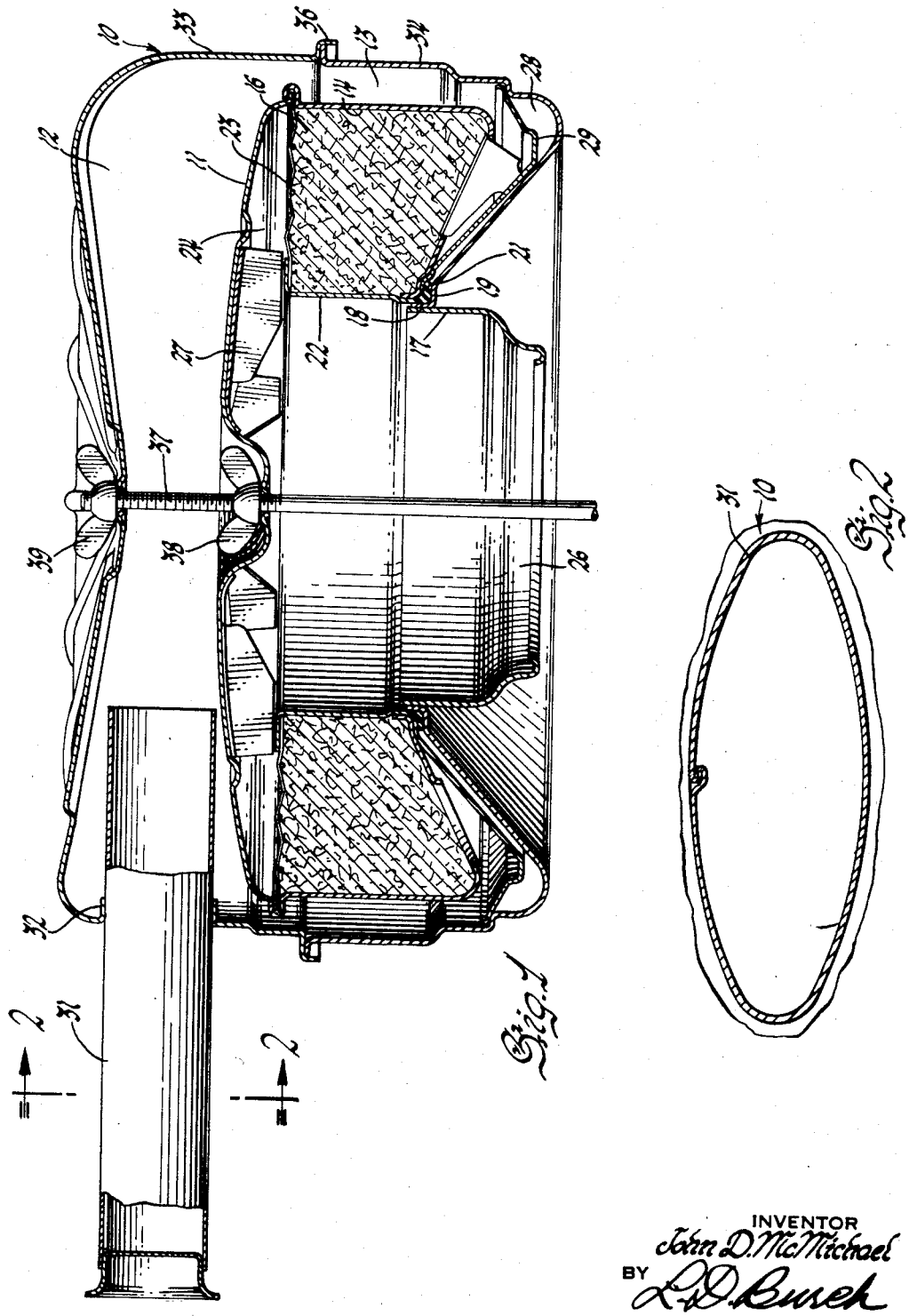
INVENTOR
John D. McMichael
BY
L. D. Burch
ATTORNEY

United States Patent Office 2,865,467
Patented Dec. 23, 1958

2,865,467

CLEANER SILENCER ASSEMBLY

John D. McMichael, Swartz Creek, Mich., assignor to General Motors Corporation, Detroit, Mich., a corporation of Delaware Application September 15, 1955, Serial No. 534,422

1 Claim. (Cl. 183—44)

This invention relates to cleaner silencer assemblies and has particular relation to cleaner silencer assemblies especially applicable for use with engines for automotive vehicles where the space available for such assemblies is limited.

It is proposed to construct an efficient but inexpensive cleaner silencer assembly which will require a minimum space for the installation thereof, which can be constructed from a minimum number of parts and can be manufactured, assembled, and serviced at a low cost.

Figure 1 is a vertical sectional view through a cleaner silencer assembly embracing the principles of the invention.

Figure 2 is a cross sectional view through the inlet conduit for the cleaner silencer assembly illustrated by Figure 1. Figure 2 is taken substantially in the plane of line 2—2 on Figure 1 looking in the direction of the arrows thereon.

The cleaner silencer assembly embracing the invention comprises an outer casing 10 and an inner casing 11, the two casings being spaced from one another between the upper walls thereof to provide an inlet or expansion chamber 12 and between the side and lower walls thereof to provide an annular inlet passage 13 leading from the expansion chamber 12 to the lower part of the inner casing 11. The inner casing 11 is formed to provide an annular chamber 14 in the lower part thereof which is adapted to receive a filter element 16 for cleaning air supplied through air inlets formed in the lower wall of the casing. The inner wall of the casing 11 is adapted to communicate with the induction system of an internal combustion engine through an outlet tube indicated at 17. The outlet tube 17 is adapted to be welded or otherwise secured to a flange 18 formed around an opening in the lower wall of the casing 10 which receives the conduit 17. An annular seat 19 is formed around the flange 18 and on the lower wall of the casing 10 for receiving a resilient gasket 21 for supporting the inner casing 11 adjacent the inner peripheral edge thereof. When assembled on the gasket 21, the inner wall 22 of the inner casing 11 provides substantially a continuation of the conduit 17 to the upper part of the chamber 14 in which the filter element 16 is located. The filter element 16 is adapted to be secured in the chamber 14 by an annular screen 23 which is spaced from the upper wall of the casing 11 to provide an outlet chamber 24. The inner part of the chamber 24 communicates with the outlet passage 26 formed by the wall 22 and the conduit 17. The outlet chamber 24 contains radially disposed spacing means indicated at 27 for spacing the upper wall of the inner casing 11 from the outwardly flanged upper end of the inner wall 22. The space between the lower walls of the outer and inner casings 10 and 11 provides an oil sump 28 in which a baffle 29 is adapted to be located. The baffle 29 is adapted to control the oil within oil sump 28 and the supply and return thereof to and from the filter element 16.

Both the outer and inner casings 10 and 11 are of considerably greater width than height to provide a cleaner silencer assembly that will be operable within the relatively wide but shallow space between the upper part of an internal combustion engine and the hood of a motor vehicle with which the engine may be employed. The inlet chamber 12, therefore, is a relatively wide but shallow chamber which is large enough to supply air to the annular inlet passage 13 and large enough to provide an expansion chamber for creating interference in the sound that may emanate from the engine through the outlet passage 26, the outlet chamber 24, the filter chamber 14, and the annular inlet 13.

Air is supplied to the chamber 12 through an inlet tube 31 which extends through a flanged opening in a side wall of the casing 10 and toward the central part of the chamber 12. The tube 31 is relatively long and is oval or flat as is indicated in Figure 2. The tube may be welded or otherwise secured in the flanged opening at 32.

Air is admitted to the chamber 12 through the tube 31, it being preferable to direct the tube 31 forwardly with respect to the motion of the vehicle with which the engine may be employed. This will cause air from the engine fan or from the motion of the vehicle to be directed toward the end of the tube. The tube is large enough in cross section so as not to present too much frictional resistance to the entry of air into the chamber 12. The tube is oval or relatively flat so as not to require too much height in the entire assembly structure. In the present instance, the tube 31 is almost as high as the chamber 12 is deep but it is preferable not to have the end of the tube engage the upper walls of either of the casings 10 and 11.

The chamber 12 also provides an expansion chamber for receiving sound emanating from the engine through the annular inlet 13. The sound waves engage the various walls forming the chamber 12 and tend to vibrate the walls and reflect therefrom thus providing interference with the waves that tends to attenuate the sound. The sound waves also may be directed outwardly through the tube 31 but the tube is long enough and of such cross sectional area as to provide a substantial impedance to the movement of sound through the tube, thereby filtering the sound waves to exclude all but the low frequency sound waves. The tube 31 is tuned in such a way that it will exclude a large part of the sound emanating from a particular engine with which the cleaner silencer structure may be employed.

The casing 12 is made in upper and lower sections 33 and 34, respectively, adapted telescopically to engage one another upon the flanges indicated at 36. The upper section 33 may be removed from the lower section 34 to render the air cleaner within the casing 11 accessible. The air cleaner may be removed simply by lifting the casing 11 from engagement with the gasket 21. The sections 33 and 34 are adapted to be secured together upon the inlet to the induction system of the engine by a bolt 37 adapted to extend through openings in the upper walls of the casings 10 and 11. The lower end of the bolt may be secured in the induction system inlet for the engine. Wingnuts 38 and 39 may be employed for securing the bolt 37 upon the casings 10 and 11.

I claim:

A cleaner silencer assembly comprising inner and outer casings having aligned inner conduits forming an outlet to be connected to the induction system of an internal combustion engine, said inner and outer casings having spaced upper walls providing an inlet chamber and spaced side and lower walls providing an annular inlet passage communicating with said inlet chamber, said inner casing providing an annular filter chamber communicating with said annular inlet passage and having an upper wall spaced from the upper end of one of said aligned inner conduits and providing an outlet chamber between said filter chamber and said outlet, an annular filter in said filter chamber, annular shoulder means formed on the adjacent ends of said aligned inner conduits and on said inner and outer casings and providing annular seating means for supporting said one of said aligned inner conduits on the other of said aligned inner conduits and said inner casing on said outer casing, spacing means between said upper end of said one of said aligned inner conduits and said upper wall of said inner casing, means removably securing said inner and outer casings on said annular shoulder means, means removably securing said inner and outer casings to said induction system of said engine and on the other of said aligned conduits, and an inlet conduit extending through an outer wall of said outer casing and into said inlet chamber and supplying air to said assembly to be cleaned by said annular filter, said inlet conduit and said chambers and passages leading to said induction system of said engine being tuned to attenuate sounds emanating from said induction system of said engine.

References Cited in the file of this patent

UNITED STATES PATENTS

| | | |
|---|---|---|
| 2,299,157 | Lowther | Oct. 20, 1942 |
| 2,511,713 | Hoyle | June 13, 1950 |
| 2,626,010 | Sebok | Jan. 20, 1953 |
| 2,665,771 | Sebok | Jan. 12, 1954 |
| 2,788,086 | Sebok | Apr. 9, 1957 |

FOREIGN PATENTS

| | | |
|---|---|---|
| 231,221 | Switzerland | May 16, 1944 |
| 922,975 | France | Feb. 10, 1947 |